Dec. 29, 1970   M. DICKINSON   3,550,441
APPARATUS FOR TESTING THE PROPERTIES OF
RUBBER OR RUBBER-LIKE MATERIALS
Filed Aug. 21, 1968   2 Sheets-Sheet 1

INVENTOR
Michael Dickinson
BY Glascock, Downing
& Seebold
ATTORNEYS

United States Patent Office 3,550,441
Patented Dec. 29, 1970

3,550,441
APPARATUS FOR TESTING THE PROPERTIES OF RUBBER OR RUBBER-LIKE MATERIALS
Michael Dickinson, Solihull, England, assignor to Joseph Lucas (Industries) Limited, Birmingham, England
Filed Aug. 21, 1968, Ser. No. 754,246
Int. Cl. G01n 3/08
U.S. Cl. 73—94         3 Claims

ABSTRACT OF THE DISCLOSURE

Apparatus for testing the properties of rubber or rubber-like materials which comprises a base for supporting a specimen and a clamping plate connected to the base in spaced relationship. There being disposed between the base and clamping plate a pressure plate having an electrically conductive contact piece extending from its center towards a screw plug on the clamping plate whereby a load can be applied through the contact piece and pressure plate to a specimen trapped between the pressure plate and the base. In addition, means is provided for applying an additional measurable load to the pressure plate in a direction to compress the specimen. The arrangement being such that when the additional load exceeds the load applied from the clamping plate, the contact piece will be removed from the screw means to break an electric circuit.

---

The object of this invention is to provide convenient apparatus for testing the properties of rubber or rubber-like materials, and more particularly for testing the properties of seals formed from such materials.

Apparatus according to the invention comprises in combination a base for supporting the specimen, a pressure plate arranged to bear against a specimen supported on the base, an electrically conductive contact piece upstanding from the center of the pressure plate, a clamping plate connected to the base, screw means whereby a load can be applied from the clamping plate through the contact piece and pressure plate to a specimen on the base, load applying means arranged to bear on the pressure plate, and load measuring apparatus associated with said load applying means, the arrangement being such that when the load applied by said load applying means exceeds the load applied from the clamping plate, the contact piece will be removed from contact with the clamping plate to break an electric circuit.

Figure 1:
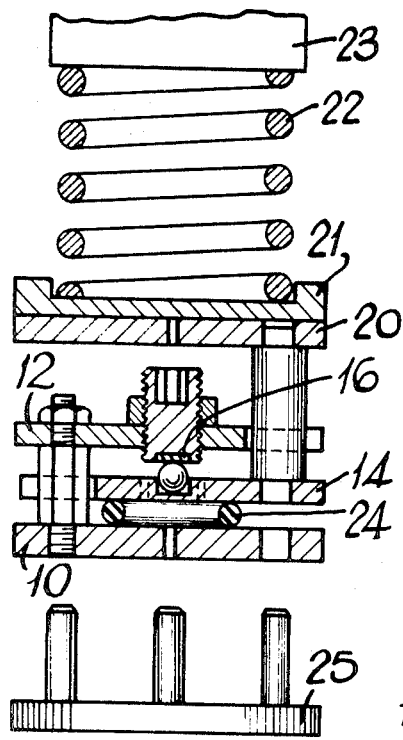
Figure 2:
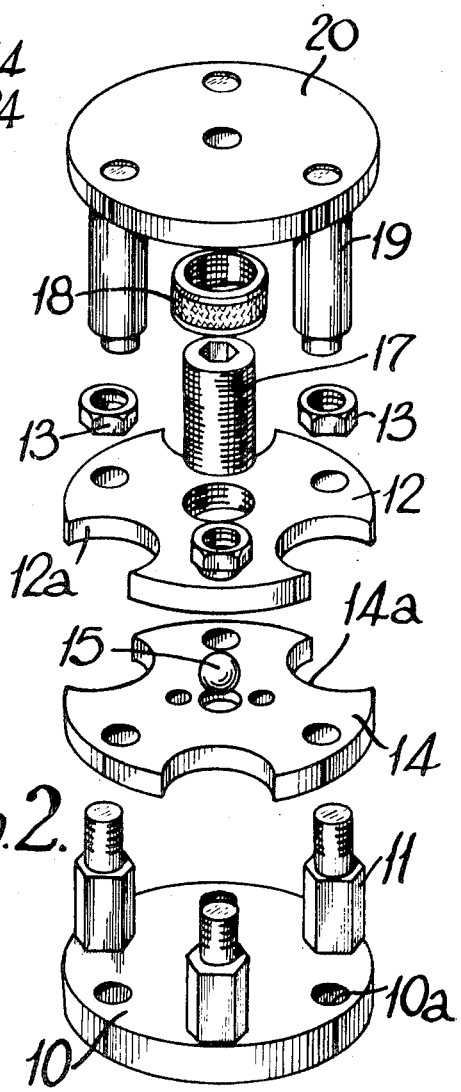
Figure 3:
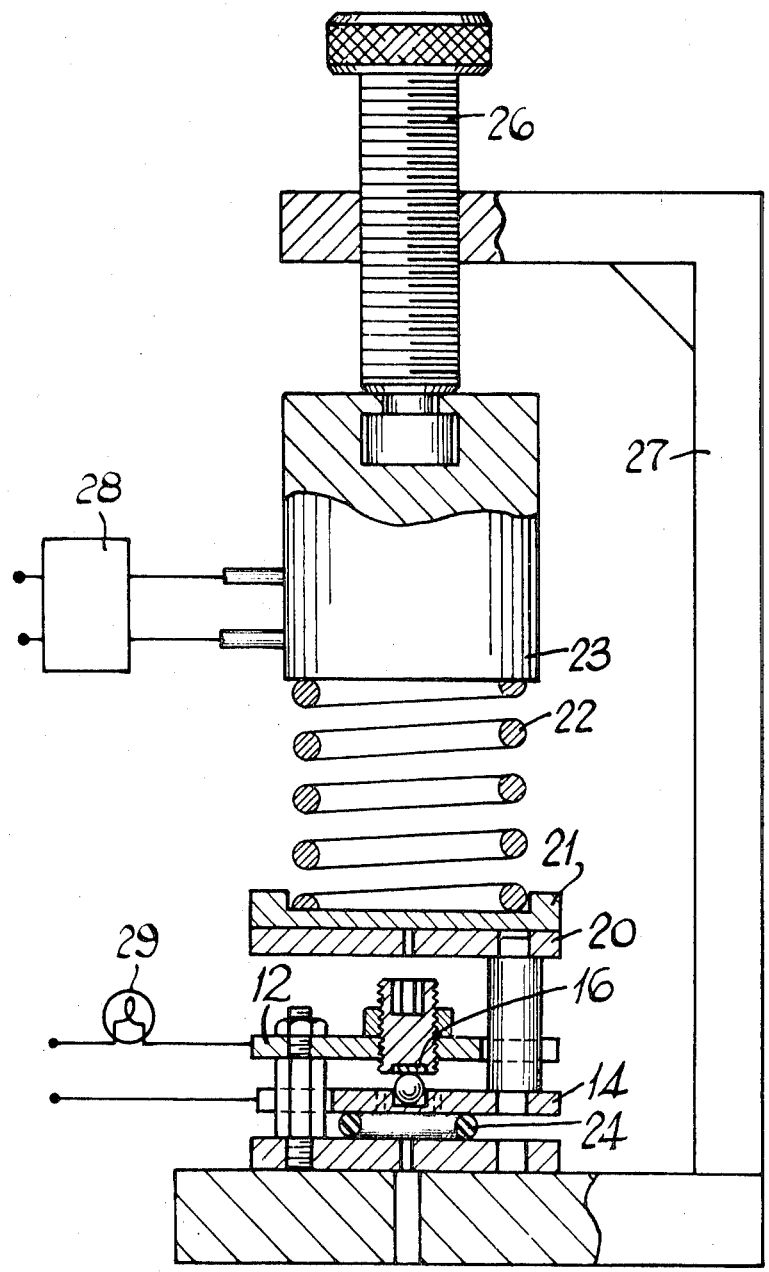

An example of the invention will now be described with particular reference to the accompanying drawings in which FIG. 1 is a sectional side view, FIG. 2 is an exploded perspective view of sufficient of the apparatus for an understanding of the invention, and FIG. 3 is a side view of the apparatus seen in FIG. 1 inserted in a frame.

Referring to the drawings there is provided a base 10 having three equiangularly spaced upstanding posts 11 whereby it is connected in spaced relationship to a clamping plate 12, held in position by means of nuts 13 engaging the upper screw threaded ends of the posts 11. Between the base 10 and clamping plate 12 is a pressure plate 14 having peripheral recesses 14a to accommodate the posts 11 with freedom. At the center of the plate 14 is a recess in which is located a hardened steel ball 15 which constitutes an upstanding electrically conductive contact piece. The ball 15 is arranged to bear against a hardened steel contact piece 16 carried by a screw threaded plug 17, engaged within a screw threaded hole at the center of the plate 12, the plug 17 being locked in position within the hole in the plate 12 by means of a knurled lock nut 18.

The pressure plate 14 is connected by three equiangularly spaced posts 19 passing with freedom through peripheral recesses 12a in the plate 12, to a further plate 20. Against the plate 20 bears an abutment piece 21 in which is located the lower end of a coiled compression spring 22, the upper end of which bears upon a load cell 23. The cell 23 can be moved vertically by means of a screw 26 relative to a frame 27 against which the base 10 can bear as shown in FIG. 3, thus downward movement of the cell 23 will cause the spring 22 to be compressed and thereby apply a load to the pressure plate 14; this load being measurable in the load cell 23 by means of a known electric circuit 28.

In order to test, for example, a rubber or rubber-like sealing ring 24, the latter is placed beneath the pressure plate 14 on the base 10. The plug 17 is then adjusted in the plate 12 until a sufficient force is applied through the contact pieces 15 and 16 to the pressure plate 14 to compress the sealing ring 24 to a predetermined extent. The contact pieces 15, 16 are connected in an indicator circuit including, for example, a lamp 29. This circuit will be broken as soon as the contact piece 15 is removed from the contact piece 16. Thereafter, a gradually increasing load is applied through the load cell 23 to the pressure plate 14. As soon as the load thus applied exceeds the load applied through the clamping plate 12 and plug 17, the contact pieces 15, 16 will be separated thereby giving indication by means of the lamp 29. A reading of this load can then be taken by means of the load cell circuit 28.

To assist in the introduction and removal of a test piece 24, a separate tool 25 may be provided, this tool consisting of a plate having three equiangularly spaced posts arranged to pass through correspondingly spaced holes 10a formed in the base and to bear against the ends of the posts 19 connecting the pressure plate 14 to the plate 20.

The specimen receiving portion of the apparatus comprising items 10, 12, 14, 20 and their associated parts can be removed from the load measuring device and placed in any selected environmental condition for any length of time as required, without removing the specimen from its compressed state.

Having thus described my invention what I claim as new and desire to secure by Letters Patent is:

1. Apparatus for testing the properties of rubber or rubber-like materials comprising in combination a base for supporting the specimen, a clamping plate structurally connected to the base in spaced relationship, a pressure plate disposed between the base and clamping plate, an electrically conductive contact piece extending from the center of the pressure plate towards the clamping plate, screw means on the clamping plate acting on the contact piece whereby a load can be applied through the contact piece and pressure plate to a specimen trapped between the pressure plate and the base, means through which an additional and measurable load can be applied to the pressure plate in a direction to compress the specimen and an electric circuit including the contact piece and the screw-means which will be broken when the additional load is sufficient to cause separation of the contact piece from the screw means.

2. Apparatus as claimed in claim 1 in which a said screw means is a central screw threaded plug engaging a screw threaded hole in the clamping plate and having a hardened steel contact piece arranged to bear against the contact piece on the pressure plate.

3. Apparatus as claimed in claim 2 in which the contact piece upstanding from the center of the pressure plate is a hardened steel ball located within a recess in the pressure plate.

References Cited

UNITED STATES PATENTS

| 2,198,259 | 4/1940 | Smith | 73—83 |
| 2,637,203 | 5/1953 | Gehman | 73—94 |
| 3,216,242 | 11/1965 | Eyrich | 73—94 |

FOREIGN PATENTS

| 184,500 | 7/1966 | Russia | 73—94 |

RICHARD C. QUEISSER, Primary Examiner

M. SMOLLAR, Assistant Examiner

U.S. Cl. X.R.

73—83